United States Patent [19]

Rolon

[11] 3,958,250
[45] May 18, 1976

[54] GRAPHIC PLOTTING SYSTEMS
[75] Inventor: Arnaldo Rolon, Houston, Tex.
[73] Assignee: Sequential Data Machines, Inc., Houston, Tex.
[22] Filed: Feb. 27, 1975
[21] Appl. No.: 553,620

[52] U.S. Cl. .................................. 346/24; 178/7.6; 346/108
[51] Int. Cl.² ........................................ G01D 15/14
[58] Field of Search .................... 346/108, 24, 138; 178/7.6, 6.7 R

[56] References Cited
UNITED STATES PATENTS

| | | | |
|---|---|---|---|
| 1,746,407 | 2/1930 | Schroter et al. | 346/108 X |
| 3,154,371 | 10/1964 | Johnson | 346/108 |
| 3,293,657 | 12/1966 | Silverman | 346/108 |
| 3,474,459 | 10/1969 | Silverman | 346/108 |
| 3,534,380 | 10/1970 | East et al. | 346/24 X |
| 3,816,659 | 6/1974 | Landsman | 178/7.6 |

*Primary Examiner*—Joseph W. Hartary
*Attorney, Agent, or Firm*—Donald H. Fidler

[57] ABSTRACT

An improved high speed photographic data plotting system is disclosed. This system uses a modulated laser light which is moved or scans a photographic film on a concave cylindrical surface from source location on a central axis. The scan is in a direction transverse to the length of the film. The laser light source location on the central axis can be incrementally stepped between each scan so that exposure of the film is in lines along the length of the film. The system includes means for feeding a film to a concave surface, means for securing the film to the surface, and means for cutting the film into a segment. The laser light source is exterior to the photographic chamber and the light beam is modulated and is transmitted along a central axis onto a rotating surface (source location) which projects the light beam normal to the central axis and onto the film.

7 Claims, 5 Drawing Figures

GRAPHIC PLOTTING SYSTEMS

BACKGROUND OF THE INVENTION

This invention relates to apparatus for accurately directing a modulated laser beam onto an arcuately curved film surface for high speed data plotting.

In seismic prospecting, it is now possible to obtain quantities of data relative to a vertical section through the earth formations in a data processing format. In this as well as other applications, it is often desirable to obtain an image reproduction from the data for visual analysis and display. Heretofore, several approaches have been employed. For example, in U.S. Pat. No. 3,561,659, a system is illustrated where a modulated laser beam projects data to the exterior surface of a cylindrically curved film. In U.S. Pat. No. 3,441,949, the system's laser beam projects data to a flat film surface. Non-linear scan effects occur where the light is transmitted from a fixed source to the flat surface. It is highly desirable to project the light to a film in a uniform and consistent manner so that the film reflects the data information independently of errors introduced by the mechanical arrangement of the apparatus.

SUMMARY OF THE INVENTION

In the concept embodiment of the present invention, film is fed or supplied onto a concave surface which is defined by an arc extended for about 190° around a central axis. A vacuum means is provided to draw the film into engagement with the concave surface and a wiper roller is swung through an arc about the central axis to insure the fit of the film to the concave surface. A transverse cutter cuts the length of film after the film has been positioned on the concave surface. A laser beam is modulated to reflect the data information and is projected along the central axis to a rotating mirror surface on the central axis. The mirror surface directs the light normal to the central axis onto the film on the concave surface. The light is discontinued during 170° of rotation while the mirror surface faces away from the film. During the 170° of rotation of the rotating mirror surface, a lengthwise step of reflecting mirror can be obtained. To accomplish this, the rotating mirror surface is mounted on a traverse frame for lengthwise movement along the chamber. An optical encoder is coupled to the rotating shaft for the rotating mirror for providing electrical position data signals of the surface. The position signals control the on-off condition of the modulated light. Thus, the data is coordinated for each scan across the film.

In this system, the distance from the light source on the central axis to the film is always constant and a constant rotating speed can be maintained for the rotating mirror surface. The fidelity of the reproduction is greatly enhanced because cynchronization between the speed of the light source and its relationship to the film surface is eliminated.

The invention, as well as its many advantages, will be further understood by reference to the detailed description and drawings.

DESCRIPTION OF THE PREFERRED EMBODIMENT

Figure 1:
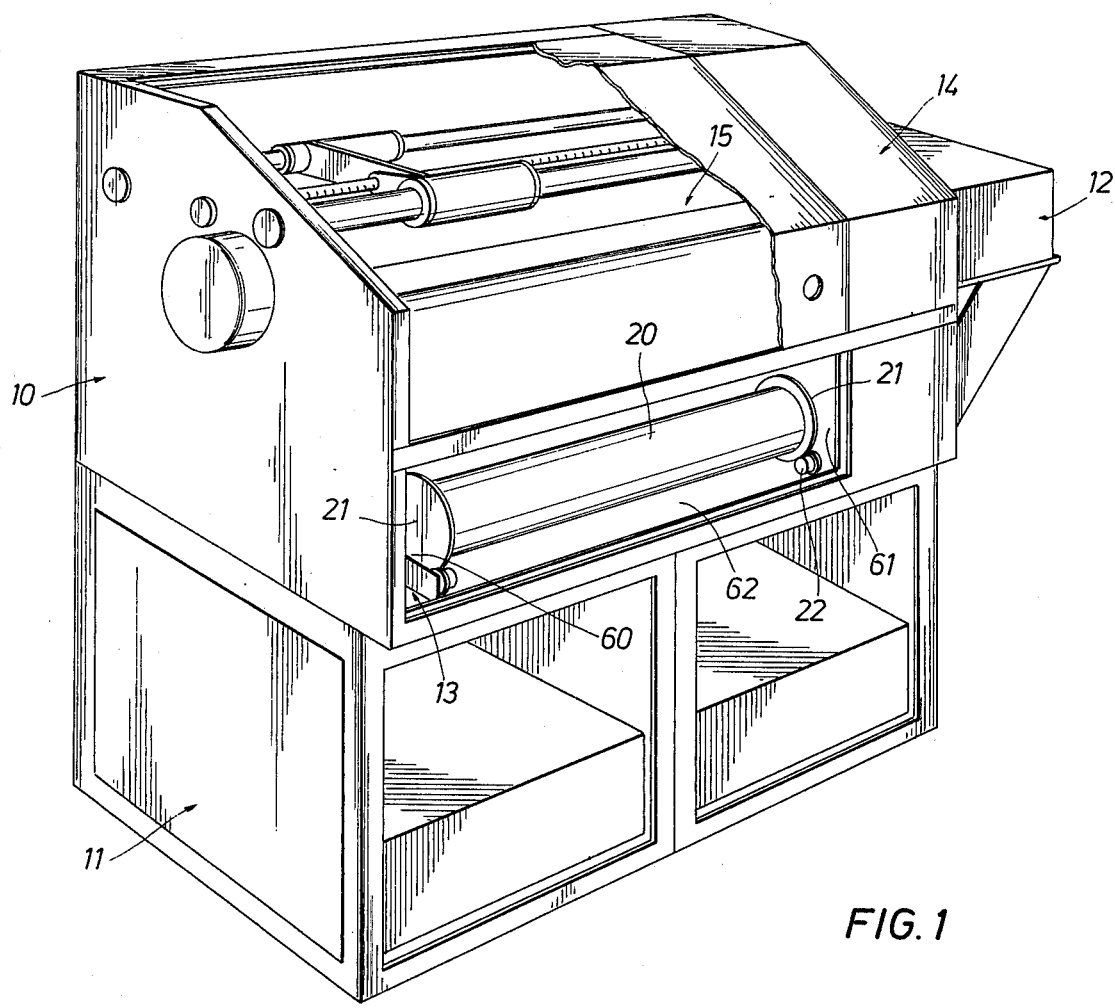
FIG. 1 is a perspective view of the overall arrangement of the plotter system of the present invention.
Figure 5:
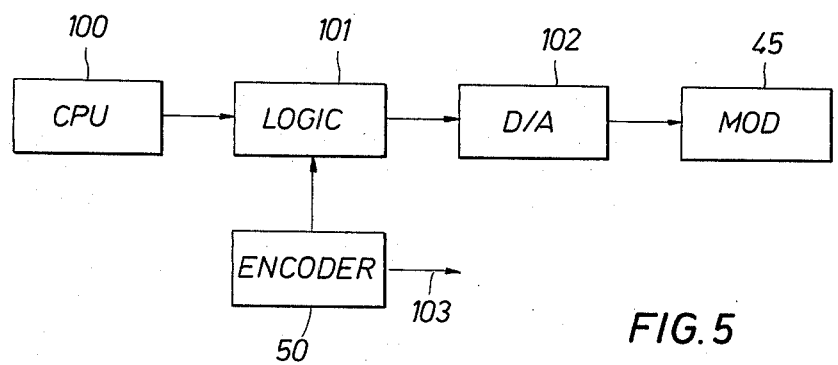
FIG. 5 is a schematic representation of the overall electronics for the system.
Figure 2:
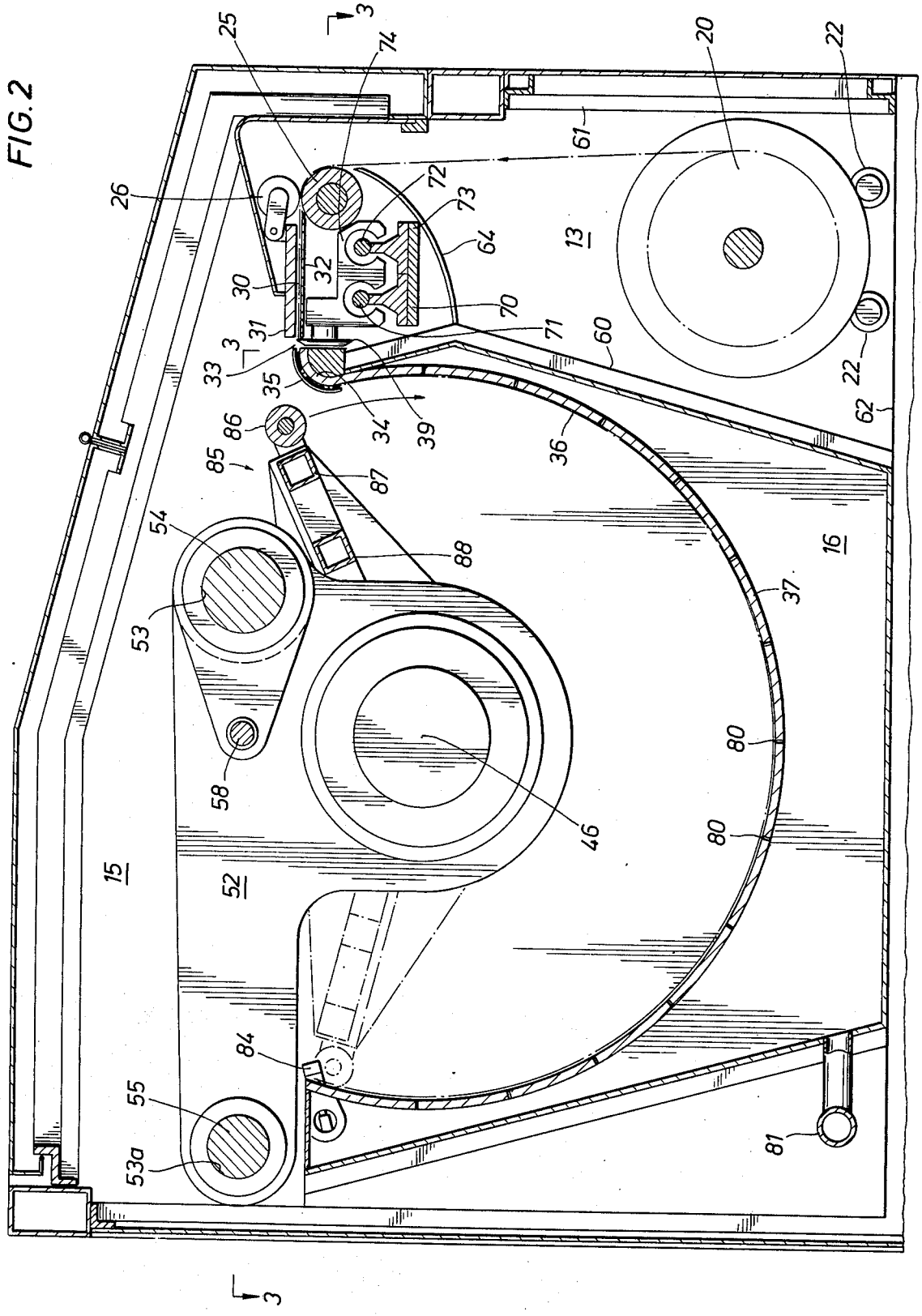
FIG. 2 is a view in cross-section taken generally along Line 2—2 of FIG. 3.

Referring now to FIG. 1, a general illustration of the graphic plotting system of the present invention is provided. The system includes a cabinet or enclosure 10 which is supported on an orthogonal base portion 11. The base portion 11 provides a suitable location for electronics components and other ancillary equipment necessary for the operation of the system. The cabinet 10 has several major subsections which include a laser housing 12 (FIGS. 1, 3 and 4), a film supply compartment 13 (FIGS. 1 and 2), a motor drive compartment 14 (FIGS. 1, 3 and 4), a film compartment 15 (FIGS. 1–4), and a vacuum chamber 16 (FIGS. 2 and 4).

It is the general purpose of this system to cause a series of discretely generated light spots to be successively projected from a source on a central axis of the film plotter compartment to a curvilinear arranged photographic film, where the surface of the film is equidistantly spaced from the central axis. The source is directional and rotated about the central axis so that the sequentially generated light spots are transmitted to the film in a plane which is transverse to the length of the film. After a sequence of light spots traverse the film once (sometimes called a "scan"), the source can be moved lengthwise of the film before another of the discrete transverse or scan by the rotating directional source. The intensity of the light spots are modulated in accordance with input data.

As an example, seismic data can be obtained for vertical plane through earth formations in a processing data format. This data is then synthesized and programmed to electronic raster data. The raster data is input to the system of the present invention and exposes the film segment in relation to the input raster data. The film segment, when developed, then provides a pictorial representation of the seismic data for the given plane through earth formations.

In the operation of the system of the present invention, a film segment is obtained from a roll of film contained within a light sealed film enclosure or compartment 13. The roll of film 20 is mounted on end caps or flanges 21 which are rotatably supported on rollers 22. Drive rollers 25 and 26 engage this upper and lower surfaces of the film and feed the film from the roll 20 through a guide slot 30 into the plotter compartment 15. The film exit through a horizontal guiding slot 30 is defined between upper and lower horizontal guide members 31 and 32. At the outer end of the guide slot 30 is a vertical cutting slot 33 which is defined between the lower horizontal guide member 32 and a lower curvilinear guide surface 34. An upper arcuately curved guide surface 35 together with the lower guide surface 34 defined on arcuate guide slot which permits film to be directed onto the inner surface 36 of a cylindrically shaped platten 37. Film is positioned around the inner surface 36 of the cylindrically shaped platten by actuation of the drive rollers 25 and 26. The leading edge of the film is moved across the surface 36 until it engages a stop on the opposite edge of the platten 37. When the film is positioned on the surface 36, it is cut lengthwise by a cutter blade 39. The cutter blade 39 extends through the cutter slot 33 and is movable longitudinally of the film to cut the film to separate a film segment from the roll supply of the film. Prior to cutting the film, a vacuum chamber 16 is used to draw the film into intimate contact with the platten 37 and hold the film firmly in position.

A rotatable source or scanning means 40 on a central axis projects light information or data to the film on the surface 36. The scanning means 40 (FIG. 4) is mounted on a traverse frame 41. The traverse frame 41 is mounted for movement lengthwise of the film plotter compartment 15. A laser 42 (FIG. 3) in the laser housing 12 provides a light modulated source of discrete light spots which are transmitted along a central axis to the source and thence transversely to the film. The film is exposed in proportion to the intensity of the light spots.

Figure 3:
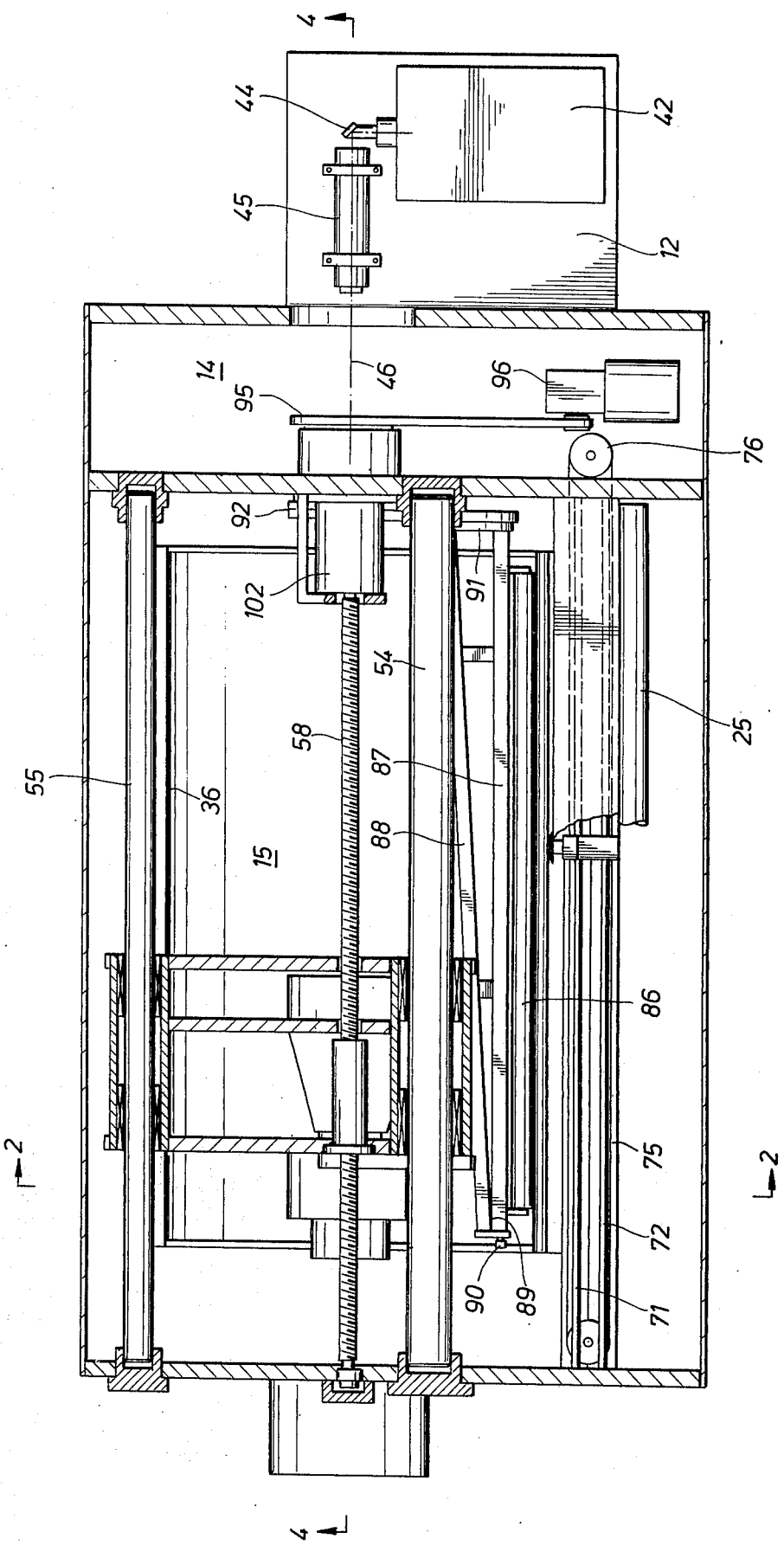
FIG. 3 is a view in cross-section taken generally along line 3—3 of FIG. 2.
Figure 4:
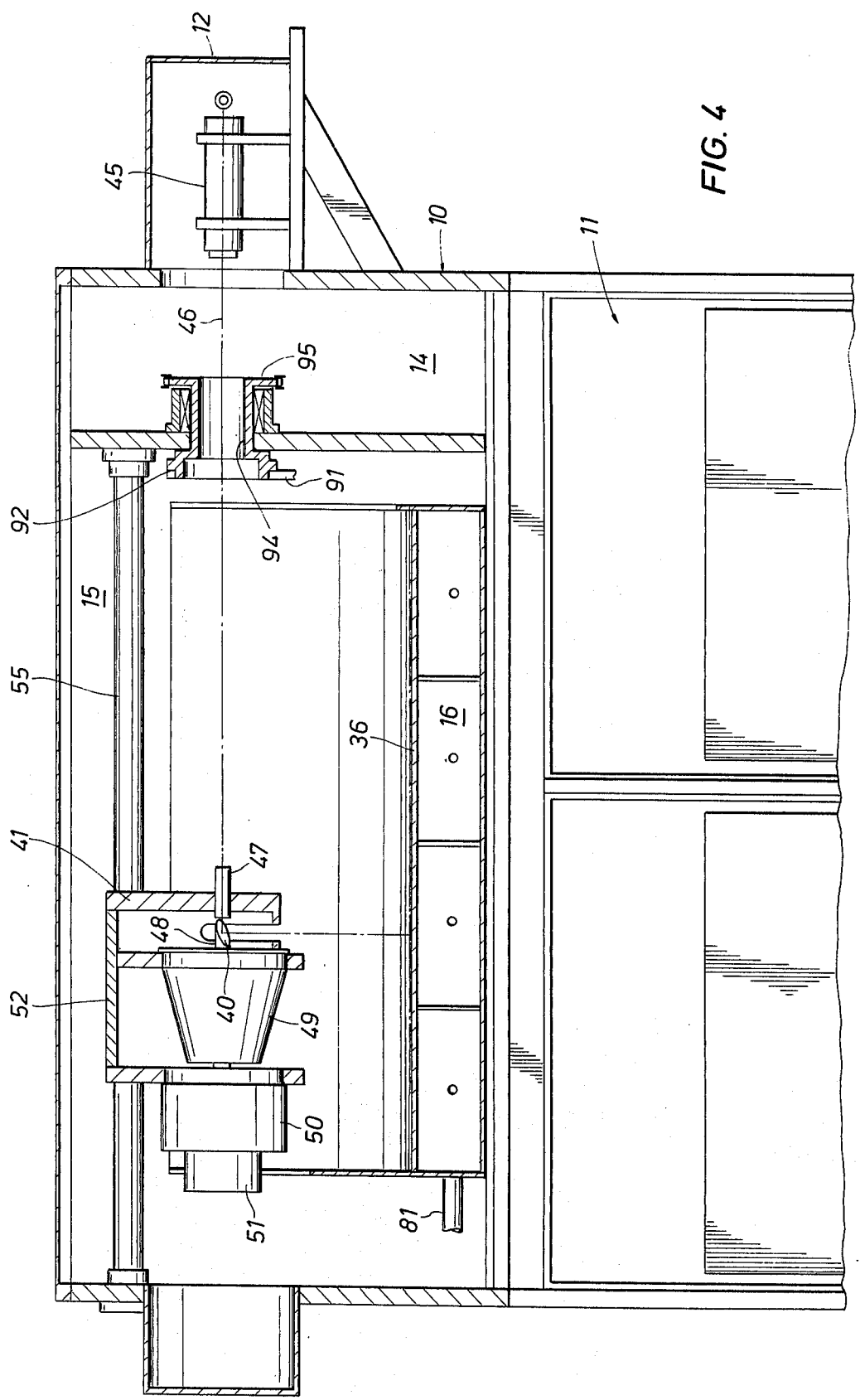
FIG. 4 is a view in cross-section taken generally along line 4—4 of FIG. 3.

Referring now to FIGS. 3 and 4, the system for transmitting the modulated light spots from the laser is illustrated. As shown in FIGS. 3 and 4, the laser means 42 generates a laser beam which is transmitted from the laser means 42 to a 45° reflection surface 44 and thence through a light modulating system 45. The light modulating system 45 produces light spots with controlled intensity. The light from the modulating system 45 is transmitted along a central axis 46 in the plotter compartment 15 to a lens 47. From the lens 47 the lght is projected to scanning means 40. The scanning means 40 has a rotating shaft 48 with a 45° reflecting surface. The reflecting surface on the shaft 48 causes light to be transmitted perpendicular to the central axis 46. The rotatable shaft 48 for reflecting surface is mounted in a bearing housing 49 and counterbalanced for precise rotation about the center axis 46.

The rotatable shaft 48 is attached to an optical encoder 50 which provides electrical signals representative of the rotational position of the shaft 48. The shaft 48 is driven by a motor 51. The motor 51, the encoder 50, the bearings 49, and the housing lens 47, are mounted in a traverse frame 52 which has guide openings 53 and 53a received on guide bars 54 and 55. The guide bars 54 and 55 extend parallel to one another and traverse the length of the film plotter compartment. The guide bars 54 and 55 are located above and to either side of the center line 46 or axis for the light beam and extend through the length of the plotter compartment. Between the guide bars 54 and 55 is a driving lead screw 58 which extends parallel to and longitudinally across the length of the plotting compartment. The lead screw 58 is received by a drive nut on the traverse housing 52 so that rotation of the lead screw in one direction traverses the frame 52 from left to right across the compartment and, in an opposite direction, traverses the frame 52 from right to left across the compartment. The lead screw 58 is driven by a stepping motor assembly 102. The stepping motor 102 and lead screw 58 are arranged to provide for incremental stepwise movement of the frame in steps of 2/1000 of an inch per increment. Thus, the traverse frame can be stepped or moved incrementally by increments of 2/1000 of an inch.

In the operation of the system, the laser light is transmitted to the rotating, reflecting surface on the shaft 48 during the period of time that the reflecting mirror surface is facing the film so that the laser light is directed to the surface of the film on the cylindrically shaped vacuum plate 37. During the period of time that the surface of the shaft 48 is not directed toward the film on the plate 37, the laser light is turned off by the modulating means 45, and the traverse frame 52 is moved longitudinally.

Referring now to FIGS. 2 and 3, the film compartment 13 is disposed within the portion of the housing defined by side walls 60 and 61, a bottom wall 62, and the end walls. An upper wall portion 64 just below the cutter assembly is used to isolate the film roll 20 in the lower part of the film compartment 13 from a cutter assembly 70.

The cutter assembly 70 includes a pair of parallel rod members 71 and 72 mounted on a traverse frame 73 which extends between the ends of the compartment. Ball bearing bushings on a traverse frame or cutter body 74 mount the frame or cutter body 74 for movement along the bar members 71 and 72. The "to" and "fro" movement of the cutter body 74 is obtained by an endless wire 75 (FIG. 3) which is pulley-mounted. The wire is connected or fixed to the cutter body 74 so that it moves with movement of the wire 75. One of the pulleys 76 is driven by a reversible motor for obtaining the desired to and fro movement of the wire and the cutter body 74.

The cutter body 74 has a cantilevered mounted cutter disc 39 which is rotatably mounted on the cutter body 74 and has its cutting edge projecting over the lip of the inlet opening for the film. The cutter body 74 is ordinarily disposed to one side of the film and out of the way of its advance through the film inlet opening. After positioning of the film on the surface 36, the cutter body 74 then can be moved to cut the film along the edge of the inlet opening.

Adjacent to the cutting slot 33 is a curved guiding shoe 35 which permits the film to be curved and directed onto the cylindrically shaped surface of the film platten member 37. The film platten member 37 is concave and semicylindrically shaped to extend for about a 190° arc about the central axis 46 for the laser beam. The film platten member 37 contains a large number of randomly spaced openings 80 which open to the underside of a film segment. The vacuum chamber 16 is defined by the cylindrically shaped platten member 37 and the walls of the container housing. A vacuum opening 81 to the housing is attached to a vacuum pump (not shown). When the vacuum pump is started, a vacuum is drawn in the chamber 16, which, in turn, draws the film segment into tight engaging contact with the platten surface 36.

The plotter member 37, at the longitudinal edge opposite to the inlet opening for the film, cooperates with a diode switch 84 which consists of a diode spaced apart from a light source. When a film is interposed between the light source and diode an electrical signal is obtained indicating the event that the film has been fully loaded around the circumference of the platten 37.

To insure the conformity of the film to the surface of the film platten 37, a wiper means 85 is provided. The wiper means 85 includes a lengthwise extending roller 86 which is mounted for rotation about the central axis 46 and is spaced about 0.004 of an inch from the platten surface during the rotation so as to not directly touch the film. This effectively smoothes out any air bubbles or the like between the film and platten. The roller 86 is mounted on an arm support which consists of a pair of lengthwise extending arms 87 and 88, which are triangularly arranged with an apex 89 at one end of the roller. A guiding nub 90 (FIG. 3) at the apex 89, which is received and arcuately arranged groove around the end surface of the compartment. The nub 90 and groove maintain the positionment of the roller 86 relative to the platten 37. The other end of the triangularly arranged support members are attached to a frame part 91 (FIG. 3) which is mounted on a sleeve 92 (FIG. 4). The sleeve 92 is rotatably mounted in the frame with respect to the central axis 46. The sleeve 92 is arranged to have a central opening 94 to permit the passage of the laser beam therethrough. A pulley 95 on the sleeve in the compartment 14 is arranged with respect to a motor and drive means 96 in the motor compartment to permit rotation of the wiper roller between the position illustrated in the full lines in FIG. 2 and the position indicated in dashed lines in FIG. 2. The wiper roller 86 sweeps across the arcuate circumference of the platten 37 and causes the film to become perfectly registered with the platten.

The electronics for operating the system includes a computer 100 or other source of data in a raster format, that is, in line-by-line arrangement. The data, which can include for example, as many as 16,000 dots of information in the arcuate circumference of the platten 37, can be used and controlled with respect to its intensity and its size. The data signals are supplied to a logic circuit 101 which directs the format of the presentation desired to the film. Whatever this format may be, it is keyed with respect to the optical encoder 50 so that the data is supplied during the interval while the reflecting surface on the shaft 48 directs the laser beam toward the film. The laser or data beam is interrupted or stored until the next rotation where the reflecting surface on the shaft 48 is again directed toward the film. It is also within the province of the logic device 101 to control the amount of scan and its integrity. In the period while the rotating surface on the shaft 48 is facing away from the film and the laser information is discontinued, the stepping motor 102 for the lead screw 58 is operated so that, in effect, the movement of the traverse frame longitudinally is intermittant with the recording on the film. This need not be the case, however, but this does not permit sequential line plotting of data.

The operation of the system, briefly reinterated, is as follows: The film drive rollers 25 and 26 are actuated to supply the film from the roll 20 through the film inlet opening 30 and around the curved surface 34 to the platten 37. When the leading edge of the film interrupts the diode switch 84 on the opposite side of the platten, the film drive is stopped. Next, the cutter 70 (which is located to one side of the film) is operated. The drive pulley 76 is actuated to pull on the wire 75 and the cutter body slides along the traverse rods 71 and 72. During this movement, the cutter disc 39 cuts through the film. The vacuum pump is also turned on to draw a vacuum in the chamber 16. This brings the film into tight registry with the platten 37. Next, the wiper roller 86 is moved to sweep through an arc across the platten 37 to remove any air bubbles which might exist between the film and the platten.

The traverse frame 52 is initially positioned at the left side of the compartment (FIG. 4). The rotating shaft 48 is driven by the motor 51 so that the surface on the shaft 48 is rotated. The optical encoder 50 supplies a position indicating signal to the logic means 101. The computer 100 supplies data to the logic circuit. The encoder serves to control the logic circuit so that the modulating means 45 is operated only during the period while the light data beam is directed toward the film. A digital to analog circuit 102 is used to transmit the information or data to the modulator 45. The encoder 50 also supplies, via an output 103, a control signal to the stepping motor 102 to move the transverse frame during the period while the light beam is directed away from the film.

In the recording, the modulating means 45 controls the presence or absence of a laser light to the surface on the shaft 48. It also controls the production of the data. The control is such that the laser traverse of the film through 190° is pulsed to insure the application of the data to the film.

While particular embodiments of the present invention have been shown and described, it is apparent that changes and modifications may be made without departing from this invention in its broader aspects; and therefore, the aim in the appended claims is to cover all such changes and modifications as fall within the true spirit and scope of this invention.

What is claimed is:

1. A photographic plotting system using a light to scan a photographic film comprising
    a plotting compartment including an arcuately curved wall surface disposed about a central axis over a first arc segment of a circle,
    photographic film means adapted to be disposed on said wall surface,
    a traverse frame disposed above said wall surface,
    guide means disposed across said compartment for supporting said traverse frame and for permitting movement of said traverse frame lengthwise of said film,
    means for moving said traverse frame on said guide means transversely to the length of said film,
    reflector means mounted on said traverse frame for directing light normal to said central axis, means on said frame for rotating said reflector means, means on said frame for determining the angular position of said reflector means,
    means for generating and for directing laser light along said central axis and through the plotting compartment onto said reflector means, and
    means for coordinating the angular position of said reflector means to said light means so that the light means is operative only when directed toward said film.

2. The apparatus as defined in claim 1 wherein said curved wall has perforations opening to a vacuum chamber whereby a vacuum in said vacuum chamber affixes the film means to said wall;
    wiper means constructed and arranged to move in an arcuate path relative to said curved wall but spaced at a short distance therefrom so as to avoid contact with the film but press out any protuberances which may exist in the film;
    means for feeding film into said plotting compartment along said curved wall, and
    means located on said curved wall for indicating when a film is in position along the curved wall.

3. The apparatus as defined in claim 2 and further including cutter means disposed at the entrance of said plotting compartment, means for moving said cutter means transversely of a film for severing a film segment from a film roll, the entrance of said plotting compartment being disposed at an opposite location from said indicating means.

4. The apparatus as defined in claim 1 and further including means for modulating said light in relation to data to be recorded on said film means.

5. The apparatus as defined in claim 4 and further including means for rotating said reflector means about said central axis and encoder means for providing electrical signals representative of rotational position of said reflector means.

6. The apparatus as defined in claim 5 and further including logic means responsive to said encoder means for permitting said modulating means during said first arc segment to transmit light data and for discontinuing the transmission of light data for the remaining arc segment of the circle.

7. A photographic plotting system using a laser light to scan photographic film comprising:
- a plotting compartment including an arcuately curved wall disposed about a central axis over a substantial first arc segment of a circle, said wall having perforations therein,
- a film compartment including a film supply and means for supplying a strip of film along said curved wall,
- vacuum means cooperating with said perforations for attaching a film to said curved wall,
- wiper means,
- means for moving said wiper means in an arcuate path about said central axis at a slight spacing from said curved wall to smooth out protuberances of said film,
- cutter means in said film compartment,
- means for moving said cutter means transversely to said film to cut a film segment for said curved wall,
- a traverse frame disposed above said curved wall,
- means for moving said traverse frame transversely to the length of said film,
- reflector means mounted on said traverse frame for directing light normal to said central axis, means for rotating said reflector means, means for determining the angular position of said reflector means,
- means for directing laser light along said central axis to said reflector means, and
- means for coordinating the angular position of said reflector means to said light means so that the light means is operative only when directed toward said film.

* * * * *